(12) United States Patent
Birnie

(10) Patent No.: US 6,659,342 B2
(45) Date of Patent: Dec. 9, 2003

(54) SELF-SERVICE TERMINAL

(75) Inventor: Steven Birnie, Peterhead (GB)

(73) Assignee: NCR Corporation, Dayton, OH (US)

( * ) Notice: Subject to any disclaimer, the term of this patent is extended or adjusted under 35 U.S.C. 154(b) by 78 days.

(21) Appl. No.: 10/008,219

(22) Filed: Dec. 5, 2001

(65) Prior Publication Data

US 2002/0074394 A1 Jun. 20, 2002

(30) Foreign Application Priority Data

Dec. 16, 2000 (GB) .............................. 0030805

(51) Int. Cl.$^7$ ................................ G06F 17/60
(52) U.S. Cl. .............................. 235/379; 902/8
(58) Field of Search ................... 235/379, 380; 902/8

(56) References Cited

U.S. PATENT DOCUMENTS 4,861,049 A 8/1989 Losi
5,726,430 A 3/1998 Ruggirello
6,508,397 B1 * 1/2003 Do .............................. 235/379

FOREIGN PATENT DOCUMENTS

EP 0660280 6/1995
FR 2722598 1/1996

* cited by examiner

Primary Examiner—Harold I. Pitts
(74) Attorney, Agent, or Firm—Michael Chan

(57) ABSTRACT

A self-service terminal (10 or 110) is described. The terminal (10 or 110) includes a self-contained power supply (44 or 144) such as a battery so that the terminal (10 or 110) does not require any external power connection. The terminal may also have a wireless transceiver (42 or 142) so that the terminal does not require any external connections. In one embodiment, the terminal (10) is wearable so that a person can carry the terminal to a potential customer. In another embodiment, the terminal (110) has wheels and a motor so that the terminal is self-propelled and may be moved towards a user.

8 Claims, 2 Drawing Sheets

SELF-SERVICE TERMINAL

BACKGROUND OF THE INVENTION

The present invention relates to a self-service terminal (SST) such as an automated teller machine (ATM). In particular, the invention relates to an ATM that is portable so that it may be moved towards a user.

ATMs are well known and provide users with a convenient source of cash in an unattended environment. One disadvantage associated with conventional ATMs is that they are located in fixed geographical locations. A user must go to one of these locations to obtain cash from the ATM. As there is a high cost of ownership associated with an ATM, ATMs are typically located in areas where a large number of transactions are performed on a regular basis.

An ATM is typically large and difficult to maneuver, partly because it contains a safe and heavy modules, such as a cash dispenser, a display, a receipt printer, and such like; and partly to discourage theft of the ATM.

As a result of the expense and size of an ATM, as well as an ATM's power, security, and communications requirements, it is unusual to deploy ATMs in sites where crowds gather only seasonally (such as beaches) or infrequently (such as sports stadia) even though there may be occasions when large crowds gather at these sites.

SUMMARY OF THE INVENTION

It is among the objects of an embodiment of the present invention to obviate or mitigate one or more of the above disadvantages or other disadvantages associated with prior art self-service terminals.

According to a first aspect of the present invention there is provided a self-service terminal characterized in that the terminal has a self-contained power supply and is portable so that the terminal may be moved towards a user.

By virtue of this aspect of the invention a terminal is provided that does not require any external physical connection. This enables the terminal to be moved about while it is in use.

The self-contained supply may be a battery. The battery may be supplemented with a solar cell. Alternatively, or additionally, a clockwork power supply and/or a dynamo power supply may be provided.

The terminal may have a wireless communication facility, for example, in the form of a cellular radio-frequency transceiver.

The terminal may have wheels or rollers for enabling the terminal to move. The terminal may be self-propelled. The wheels or rollers may be permanently coupled to the terminal. The terminal may include a camera, a motor, and a steering mechanism so that it is capable of moving under guidance from a remote controller.

In a preferred embodiment, the terminal is wearable, for example, as a rucksack.

The terminal may include a Global Positioning System (GPS) to allow a remote center to track movements of the terminal.

The terminal may include a valuable media protection system, such as a system for spraying ink dye in the event of tampering with the terminal.

The terminal may be an ATM.

In one embodiment, the ATM comprises a controller, a text display, a cellular radio-frequency transceiver, a cash dispenser, a swipe card reader, and a printer. A user may enter a transaction using his/her cellular phone as a data input mechanism (for example, using the cell phone's keypad).

The text display, transceiver, swipe card reader, and printer may be incorporated into a single transaction unit that transmits data to a remote server, where the server communicates with a transaction host for authorizing a requested transaction; thus, the ATM comprises a transaction unit and a cash dispenser. The amount of cash per transaction that the cash dispenser may dispense may be limited to a low value or to a small number of banknotes, for example, one banknote.

In other embodiments, the ATM may include a keypad.

In one embodiment, the ATM includes a single module having a screen, a keypad, a printer, a magnetic card reader, and a wireless modem. Conveniently, this module is a Verifone (trade mark) OMNI 3350™(trade mark), available from Verifone, Santa Clara, Calif., U.S.A.

According to a second aspect of the present invention there is provided a method of providing automated transactions at a portable device, the method comprising the steps of:

(i) identifying people who may wish to conduct automated transactions;

(ii) moving a portable self-service terminal to the vicinity of the identified people;

(iii) moving the terminal to any individual indicating a desire to conduct an automated transaction; and (iv) allowing the individual to conduct an automated transaction.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
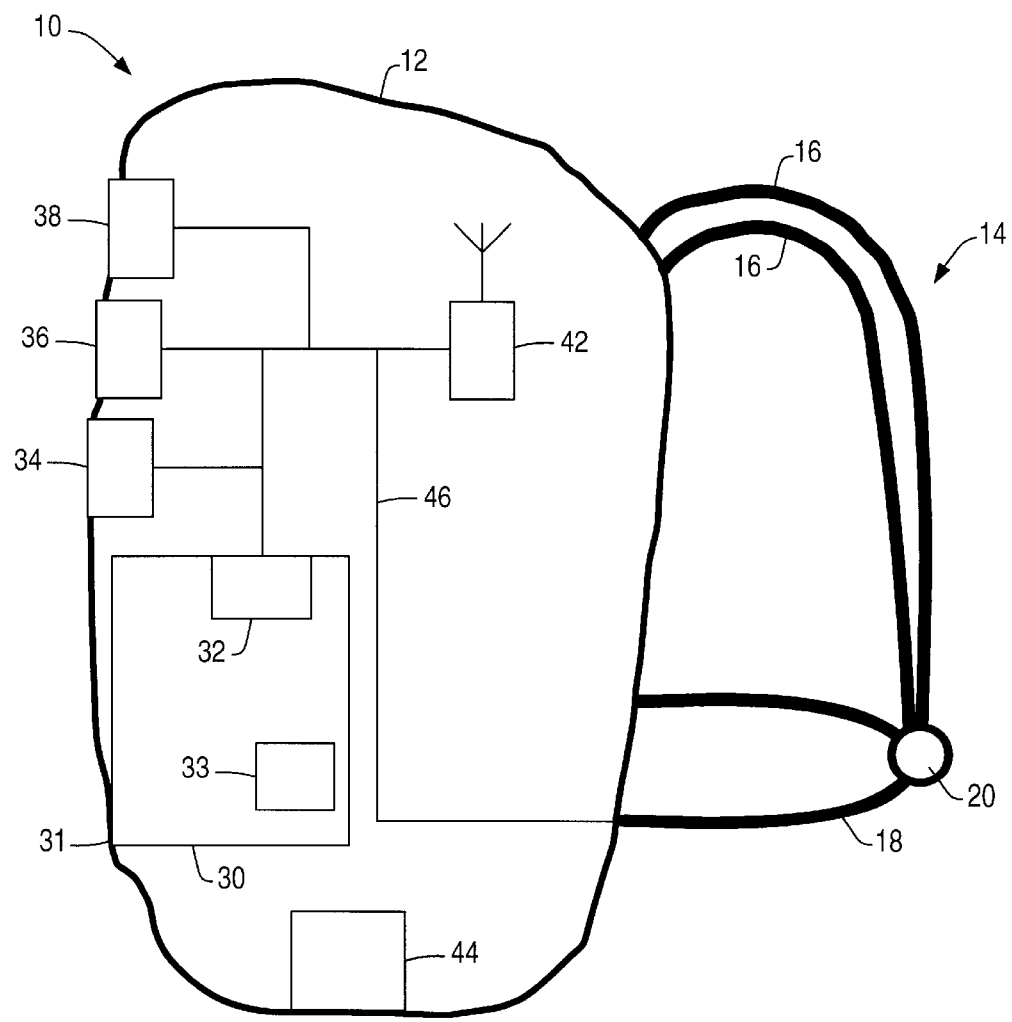
FIG. 1 is a schematic diagram of an SST according to one embodiment of the present invention.

Referring to FIG. 1, a portable SST 10 in the form of an ATM is shown in schematic form. The ATM 10 is wearable, and designed to be carried on a user's back. ATM 10 has an enclosure 12 to which is coupled a carrying harness 14 comprising shoulder straps 16 and a belt 18. The straps 16 and belt 18 interlock with a tamper sensitive buckle 20.

The enclosure 12 incorporates a simple dispenser 30 for dispensing one denomination of banknotes through a dispense slot 31 defined by the enclosure 12. The dispenser 30 includes a controller 32 for controlling the operation of the ATM 10, and an ink dye cartridge 33 for rupturing and staining any banknotes located within the dispenser 30 in the event of the buckle 20 being forced open.

The enclosure 12 defines a plurality of apertures (not shown) through which modules protrude from within the enclosure. These protruding modules include: a swipe magnetic card reader module 34; a keypad module 36; and a receipt printer module 38. The enclosure 12 also houses a cellular radio-frequency transceiver 42.

Each of the modules (30, 32, 34, 36, 38, and 42) is powered from a battery 44 in the form of a motorcycle battery (for clarity, the battery 44 is not shown connected to any of the modules).

A communications bus 46 interconnects the modules (30, 32, 34, 36, 38, and 42) within the enclosure 12 and the tamper sensitive buckle 20.

In use, the ATM 10 is lifted onto the back of a user (hereinafter referred to as the "wearer") and the wearer walks around offering ATM transactions. In particular, at a festival or similar event, the wearer identifies a group of people who may wish to conduct a transaction, approaches these people with the ATM, and allows an individual to conduct a transaction by swiping a magnetic card through the reader 34, entering their personal identification number (PIN) using the keypad 36, and entering the amount of cash they would like to withdraw using the keypad 36.

The controller 33 then instructs the transceiver 42 to obtain authorization by dialing a remote transaction switch and conveying the transaction request thereto. On receipt of authorization, the dispenser 30 then dispenses the requested number of banknotes to the individual.

When the ATM 10 has dispensed all of the banknotes within the dispenser 30, the wearer returns to a central location (not shown) to have the dispenser replenished with banknotes.

The wearer may also wear a headset so that the user is in continuous audio communication with the central location for added security and safety for the wearer.

Figure 2:
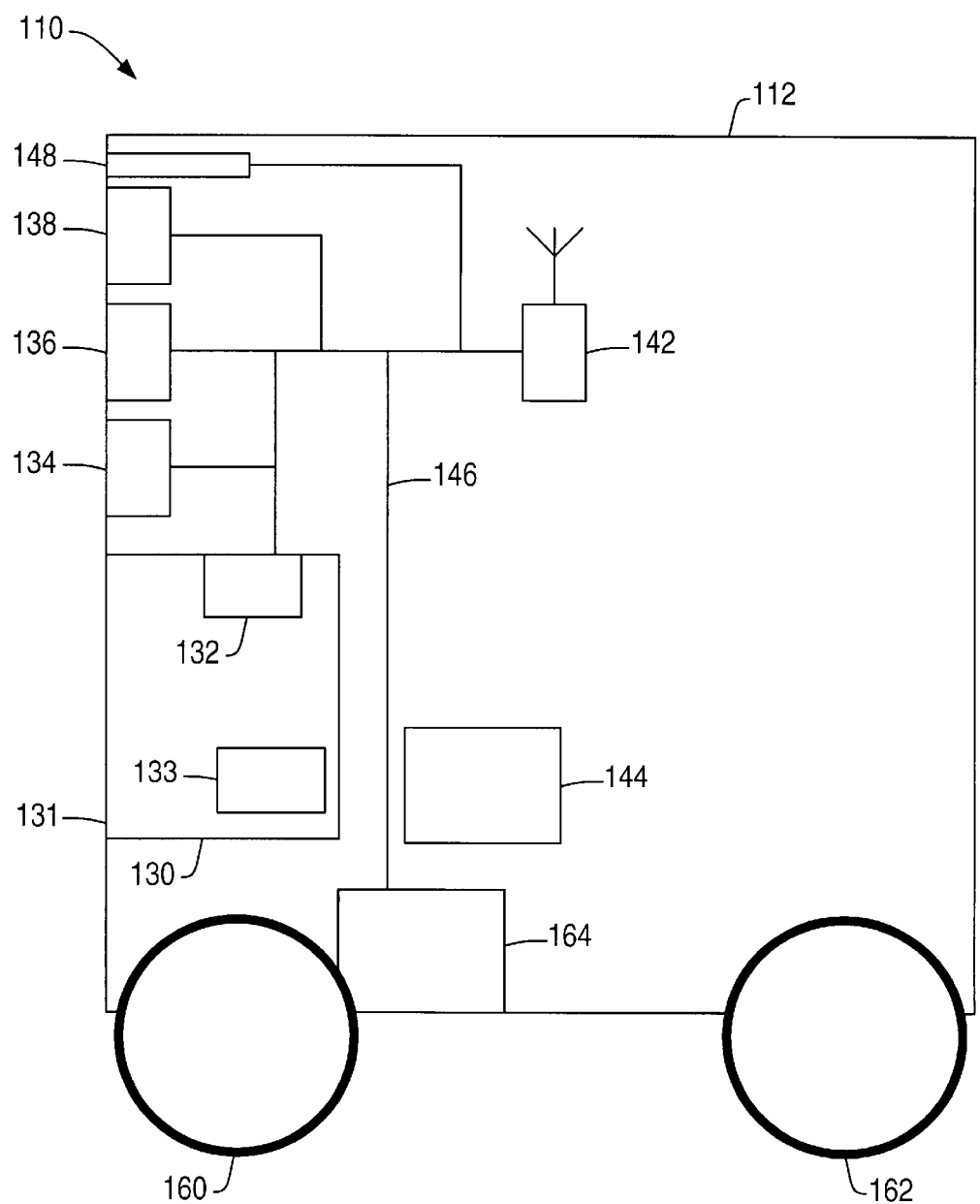
FIG. 2 is a schematic diagram of an SST according to an alternative embodiment of the present invention.

Reference is now made to FIG. 2, which shows an ATM 110 according to an alternative embodiment of the present invention. In FIG. 2, the ATM 110 is a vehicle having an enclosure 112 mounted on a pair of front wheels 160, and a pair of rear wheels 162. The front wheels 160 are steered and driven by a motor 164 that controls each of the front wheels independently.

The enclosure 112 houses a simple dispenser 130 for dispensing one denomination of banknotes through a dispense slot 131 defined by the enclosure 112. The dispenser 130 includes a controller 132 for controlling the operation of the ATM 110.

The enclosure 112 defines a plurality of apertures (not shown) through which modules protrude from within the enclosure 112. These protruding modules include: a swipe magnetic card reader module 134; a keypad module 136; and a receipt printer module 138. The enclosure 112 also houses a cellular radio-frequency transceiver 142, and a camera 148.

Each of the modules (130, 132, 134, 136, 138, 142, and 148) is powered from a battery 144 in the form of a car battery (for clarity, the battery 144 is not shown connected to any of the modules).

A communications bus 146 interconnects the modules (130, 132, 134, 136, 138, 142, and 148) within the enclosure 112.

In use, the ATM 110 is controlled remotely by an operator (not shown) in a control center (not shown). The operator can view who and/or what is in front of the ATM 110 using the camera 148. The operator can control the movement of the ATM 110 using the motor 164. Thus, the operator is able to move the ATM 110 towards groups of people to offer transactions to these people. It will be appreciated that for safety reasons the ATM 110 can only move very slowly.

Various modifications may be made to the above described embodiment within the scope of the invention, for example, in other embodiments, the printer module, the keypad module, the transceiver module, and the card reader module may be combined into a single module. In other embodiments, some of the modules may be located outside the enclosure 12, for example, on a shoulder strap 16. In other embodiments, the ATM transceiver 42 may dial a local switch having a landline connection; so that the local switch conveys the authorization request to a remote transaction switch. In other embodiments the ATM (10 or 110) may include a global position system (GPS) module to track the movement of the ATM.

What is claimed is:

1. A portable self-service terminal for allowing a user to conduct a media dispense transaction, the terminal comprising:

a housing movable between an unmounted position in which the housing is in contact with the ground and a mounted position in which the housing is spaced apart from the ground and dimensioned such that a human can lift the housing from the unmounted position to the mounted position;

a media dispenser located within the housing and for dispensing media items;

a self-contained power supply for powering the media dispenser; and a harness for retaining the housing in the mounted position at a height convenient for a user to conduct a media dispense transaction.

2. A terminal according to claim 1, further comprising a valuable media protection system for staining media items in the dispenser in the event of unauthorized tampering with the terminal.

3. A terminal according to claims 1, further comprising a wireless communication facility.

4. A terminal according to claim 1, further comprising a global positioning system for allowing a remote center to track movements of the terminal.

5. A terminal according to claim 1, wherein the self-contained power supply comprises a battery.

6. A terminal according to claim 1, wherein the media dispenser comprises a currency dispenser.

7. A method of operating a portable self-service terminal, the method comprising the steps of:

manually lifting the portable terminal from an unmounted position where the housing is in contact with the ground to a mounted position where the housing is spaced apart from the ground;

retaining the portable terminal at the mounted position for a period during which the terminal is to be operated; and removing the portable terminal from the mounted position after the period has elapsed.

8. A method according to claim 7, further comprising the step of monitoring location of the terminal using a GPS system to detect unauthorized removal of the terminal from the mounted position.

* * * * *